US012695942B2

(12) United States Patent
Su et al.

(10) Patent No.: US 12,695,942 B2
(45) Date of Patent: Jul. 28, 2026

(54) ADAPTING CONTENT ITEMS TO TARGET DELIVERY FORMATS

(71) Applicant: Google LLC, Mountain View, CA (US)

(72) Inventors: Yeping Su, Palo Alto, CA (US); Neil Aylon Charles Birkbeck, Santa Cruz, CA (US); Balineedu Chowdary Adsumilli, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 88 days.

(21) Appl. No.: 18/143,057

(22) Filed: May 3, 2023

(65) Prior Publication Data

US 2024/0373090 A1 Nov. 7, 2024

(51) Int. Cl.
*H04N 21/4402* (2011.01)

(52) U.S. Cl.
CPC ............. *H04N 21/440272* (2013.01); *H04N 21/440281* (2013.01)

(58) Field of Classification Search
CPC ............... H04N 21/440272; H04N 21/440281
See application file for complete search history.

(56) References Cited

U.S. PATENT DOCUMENTS

| | | | | |
|---|---|---|---|---|
| 10,651,871 | B1 * | 5/2020 | Dawood | ............. H03M 7/4037 |
| 2004/0181813 | A1 * | 9/2004 | Ota | .................... H04N 21/4384 |
| | | | | 348/E5.005 |
| 2004/0212731 | A1 | 10/2004 | Sie | |
| 2014/0320597 | A1 * | 10/2014 | Lee | ................. H04N 21/23614 |
| | | | | 348/43 |

| | | | | |
|---|---|---|---|---|
| 2015/0264404 | A1 | 9/2015 | Hannuksela | |
| 2016/0100111 | A1 * | 4/2016 | Atkinson | ............... H04N 7/141 |
| | | | | 348/14.01 |
| 2018/0020228 | A1 * | 1/2018 | Wu | ........................ H04N 19/91 |

(Continued)

FOREIGN PATENT DOCUMENTS

WO 2021252697 A1 12/2021

OTHER PUBLICATIONS

De Praeter et al., "Fast simultaneous video encoder for adaptive streaming," Oct. 19-21, 2015, 2015 IEEE 17th International Workshop on Multimedia Signal Processing (MMSP), pages Xiamen, China.

(Continued)

*Primary Examiner* — Joshua D Taylor
(74) *Attorney, Agent, or Firm* — Lowenstein Sandler LLP

(57) ABSTRACT

A method includes receiving, by a user device, a first bitstream. The first bitstream includes data corresponding to a media item. The first bitstream includes data for display at a first aspect ratio. The method further includes receiving a second bitstream including data corresponding to the media item for display at a second aspect ratio. The method further includes providing the first bitstream to a first bitstream decoder and the second bitstream to a second bitstream decoder. Operations of the first bitstream decoder and operations of the second bitstream decoder overlap in time. The method further includes determining whether to display the media item at the first or the second aspect ratio. The method further includes generating a composited media item based on the first bitstream and the second bitstream. The method further includes displaying the composited media item.

20 Claims, 6 Drawing Sheets

(56) References Cited

U.S. PATENT DOCUMENTS

| | | | | |
|---|---|---|---|---|
| 2023/0015840 A1* | 1/2023 | Sánchez De La Fuente | ............... | |
| | | | | H04N 21/8451 |
| 2024/0333946 A1* | 10/2024 | Udhayan | .............. | H04N 19/172 |

OTHER PUBLICATIONS

Anh et. al., "Seam carving extension: a compression perspective," Oct. 19-24, 2009, MM '09: Proceedings of the 17th ACM international conference on Multimedia, pp. 825-828, Beijing, China.

* cited by examiner

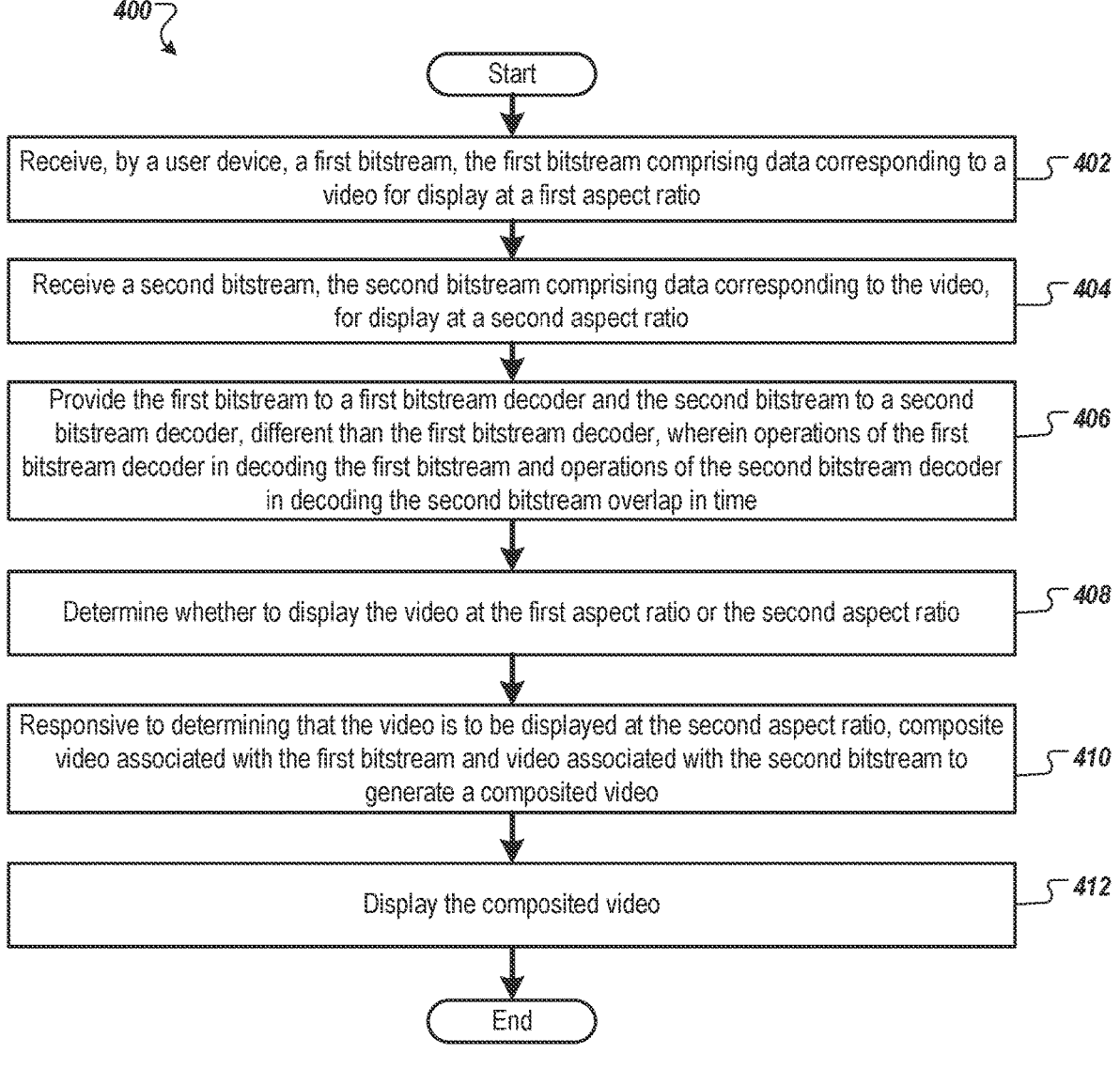

400

Start

Receive, by a user device, a first bitstream, the first bitstream comprising data corresponding to a video for display at a first aspect ratio — 402

Receive a second bitstream, the second bitstream comprising data corresponding to the video, for display at a second aspect ratio — 404

Provide the first bitstream to a first bitstream decoder and the second bitstream to a second bitstream decoder, different than the first bitstream decoder, wherein operations of the first bitstream decoder in decoding the first bitstream and operations of the second bitstream decoder in decoding the second bitstream overlap in time — 406

Determine whether to display the video at the first aspect ratio or the second aspect ratio — 408

Responsive to determining that the video is to be displayed at the second aspect ratio, composite video associated with the first bitstream and video associated with the second bitstream to generate a composited video — 410

Display the composited video — 412

End

FIG. 4

ADAPTING CONTENT ITEMS TO TARGET DELIVERY FORMATS

TECHNICAL FIELD

Aspects and implementations of the present disclosure relate to methods and systems for providing content items for display to a user. Specifically, aspects of the present disclosure relate to systems and methods for providing content items at various target display formats for display to a user.

BACKGROUND

A platform (e.g., a content sharing platform) can transmit (e.g., stream) media items to client devices connected to the platform via a network. A user may submit, via a client device, a request for a content item to be provided. The content sharing platform may provide the requested content item. The client device and/or the content sharing platform may adjust the content item for display at a target display format.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

A system and method are disclosed for displaying media at a target display format. A method includes receiving, by a user device, a first bitstream. The first bitstream includes data corresponding to a media item. The first bitstream includes data for display at a first aspect ratio. The method further includes receiving a second bitstream including data corresponding to the media item for display at a second aspect ratio. The method further includes providing the first bitstream to a first bitstream decoder and the second bitstream to a second bitstream decoder. Operations of the first bitstream decoder in decoding the first bitstream and operations of the second bitstream decoder in decoding the second bitstream overlap in time. The method further includes determining whether to display the media item at the first aspect ratio or the second aspect ratio. The method further includes, responsive to determining that the media item is to be displayed at the second aspect ratio, generating a composited media item based on the first bitstream and the second bitstream. The method further includes displaying the composited media item.

In some embodiments, generating the composited media item includes overlaying at least a portion of the media item received in the first bitstream with the media item received in the second bitstream.

In some embodiments, at least one of the first bitstream or the second bitstream further includes metadata. The metadata may include media item compositing parameters. Generation of the composited media item may be performed in view of the metadata. The metadata may include an indication of a location for overlaying a first portion of media item data over a second portion of media item data. The metadata may further include an indication that a boundary between a first region of the composited media item corresponding to the first bitstream and a second region of the composited media item corresponding to the second bitstream is to be blended.

In some embodiments, a first portion of a display of the user device is utilized in displaying the composited media item. In some embodiments, the first portion of the display includes a second portion. The second portion of the display may be utilized in displaying portions of the composited media item corresponding to data provided by the first bitstream. In some embodiments, data of the second bitstream may include media corresponding to the first portion of the display. In some embodiments, data of the second bitstream corresponding to the second portion of the display may include fewer bits than the first bitstream.

In some embodiments, a user device is configured to display media content in a first mode corresponding to the first aspect ratio and as second mode corresponding to the second aspect ratio. In some embodiments, determining whether to display the media item at the first aspect ratio or the second aspect ratio includes determining a user selection of the first mode or the second mode.

In some embodiments, the composited media item may include a first portion associated with the first bitstream, and a second portion associated with the second bitstream. In some embodiments, the second portion is of a lower resolution than the first portion.

In some embodiments, the composited media item includes a first portion associated with the first bitstream and a second portion associated with the second bitstream. The second portion may be of a lower frame rate than the first portion.

In some aspects of the present disclosure, a method includes receiving, by a processing device, a scalable bitstream. The scalable bitstream may include a base layer and an enhancement layer. The base layer may correspond to a first spatial portion of a media item. The enhancement layer may correspond to a second spatial portion of the media item. The method further includes determining a first aspect ratio for display of the media item. The method further includes determining, based on the first aspect ratio, a third spatial portion of the media item for display. The third spatial portion includes the first spatial portion. The third spatial portion further includes at least a part of the second spatial portion. The method further includes generating, based on the third spatial portion of the media item, a first enhanced media item corresponding to the first aspect ratio. The method further includes displaying the first enhanced media item.

In some embodiments, data corresponding to the enhancement layer may be more highly compressed than data corresponding to the base layer. In some embodiments, generating the first enhanced media item may include performing geometric prediction operations on data associated with the at least a part of the second spatial portion.

In some embodiments, the first enhanced media item may include a high-fidelity spatial portion associated with the base layer and a low-fidelity spatial portion associated with the enhancement layer. In some embodiments, the high-fidelity spatial portion may be disposed in a central region of the first enhanced media item. The low-fidelity spatial portion may be disposed in a peripheral region of the first enhanced media item.

In some embodiments, generating the first enhanced media item includes expanding the at least a part of the second spatial portion to generate an intermediate media item. The intermediate media item is not of the first aspect ratio. Generating the first enhanced media item may further include performing seam carving operations to generate the first enhanced media item corresponding to the first aspect ratio.

In some embodiments, the method may further include receiving a user input indicating an adjustment of the first aspect ratio to a second aspect ratio. The method may further include generating a second enhanced media item corresponding to the second aspect ratio. The method may further include displaying the second enhanced media item.

In some aspects of the present disclosure, a non-transitory machine-readable storage medium stores instructions which, when executed, cause a processing device to perform operations. The operations include receiving, by a user device, a first bitstream. The first bitstream includes data corresponding to a media item. The first bitstream includes data for display at a first aspect ratio. The operations further include receiving a second bitstream including data corresponding to the media item for display at a second aspect ratio. The operations further include providing the first bitstream to a first bitstream decoder and the second bitstream to a second bitstream decoder. Operations of the first bitstream decoder in decoding the first bitstream and operations of the second bitstream decoder in decoding the second bitstream overlap in time. The operations further include determining whether to display the media item at the first aspect ratio or the second aspect ratio. The operations further include, responsive to determining that the media item is to be displayed at the second aspect ratio, generating a composited media item based on the first bitstream and the second bitstream. The operations further include displaying the composited media item.

In some embodiments, the instructions may further indicate that a first portion of a display of the user device is to be utilized in displaying the composited media item. The instructions may further indicate that the first portion of the display comprises a second portion. The second portion of the display may be utilized in displaying portions of the composited media item corresponding to data provided by the first bitstream. The instructions may further indicate that data of the second bitstream comprises media corresponding to the first portion of the display. The instructions may further indicate that data of the second bitstream corresponding to the second portion of the display comprises fewer bits than the first bitstream.

In some embodiments, the instructions may further indicate that the user device is configured to display media content in a first mode corresponding to the first aspect ratio and a second mode corresponding to the second aspect ratio, and wherein determining whether to display the media item at the first aspect ratio or the second aspect ratio comprises determining user selection of the first mode or the second mode.

In some embodiments, the instructions may further indicate that the composited media item comprises a first portion associated with the first bitstream, and a second portion associated with the second bitstream, and wherein the second portion is of a lower frame rate than the first portion.

Optional features of one aspect may be combined with other aspects where appropriate.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 4 is a flow diagram of a method for utilizing a dual bitstream to provide content in multiple delivery formats, according to some embodiments.

DETAILED DESCRIPTION

Figure 1:
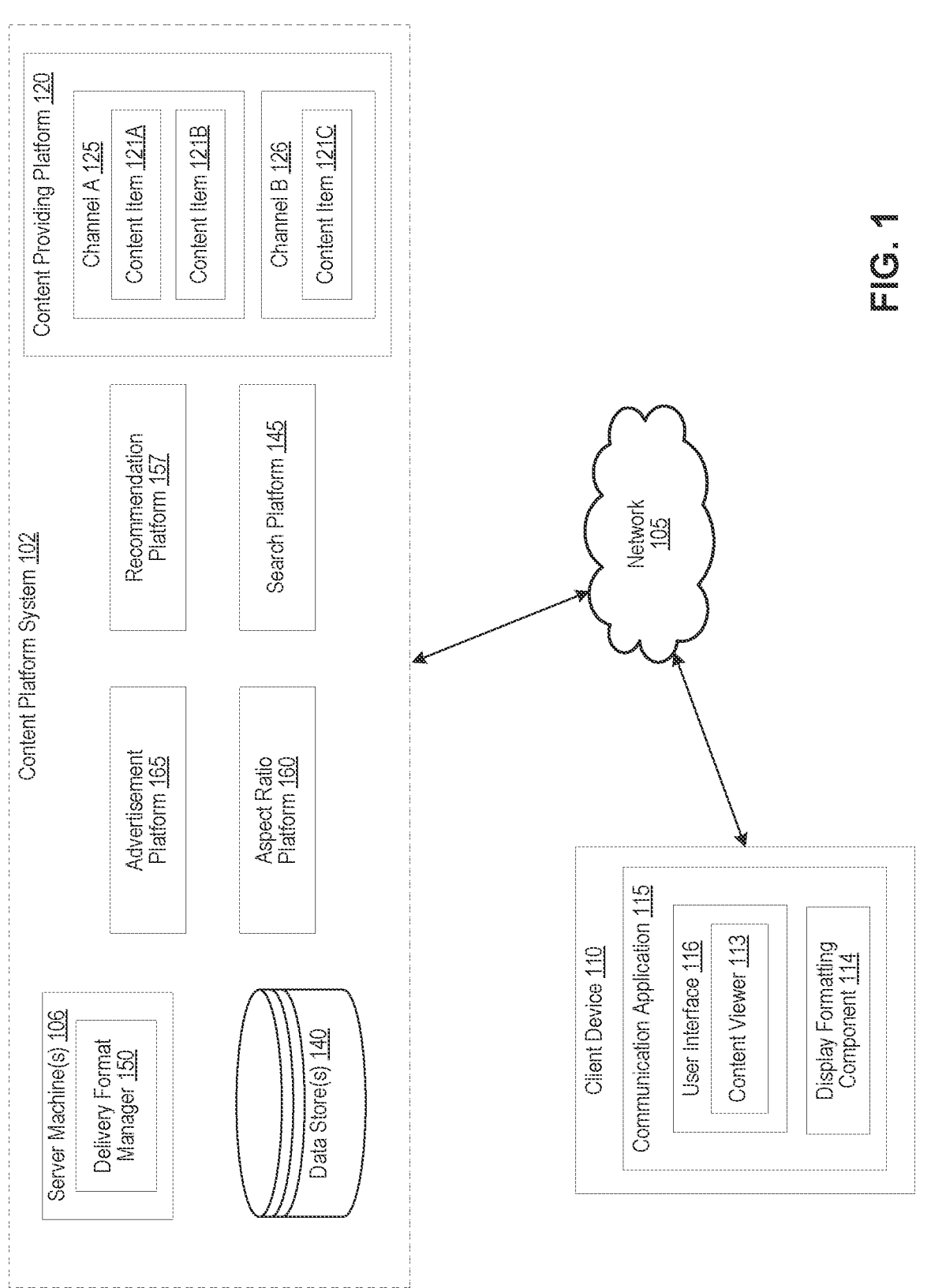
FIG. 1 illustrates an example system architecture for receiving requests for content items and providing content items for display at target display formats, according to some embodiments.

Aspects of the present disclosure relate to methods and systems for delivery of content items for display at different aspect ratios. A platform (e.g., a content sharing platform) may provide content for display by a user device. A user device may be configured to display content at one or more of a variety of aspect ratios. The platform may adjust data storage procedures, data providing procedures, etc., based on display aspect ratios.

In some systems, content may be generated at a particular intended aspect ratio (e.g., ratio of a display or display window's width to height). For example, video content may be filmed by a camera operating at a particular aspect ratio, content may be cropped by a creator to a desired aspect ratio, etc. Content may be stored as data at the associated aspect ratio.

In some systems, content items may be displayed at the intended aspect ratio, regardless of display configuration. Portions of a display or display window may be unused to accommodate the content item at the intended aspect ratio. Portions of a display or display window may be used to display alternate content to accommodate the content item at the intended aspect ratio. Aspects of the content item may be displayed at a reduced size, reduced resolution, etc., to accommodate the intended aspect ratio in the available display or display window.

In some systems, content items may be cropped for display. Portions of a content item may not be displayed to fit the content item to a display or display window aspect ratio. Cropping may be performed symmetrically about the center of the content item, an equal amount may be removed from both sides of the content item to accommodate a narrower display than the intended aspect ratio. Cropping may be performed asymmetrically, e.g., to maintain a relative position of one or more regions of interest of the content item.

In some systems, content items may be padded to generate content for display with a different aspect ratio than the intended aspect ratio. Extra space to expand the content to a display or display window aspect ratio may be filled with images, copies of portions of the content item, etc.

In some systems, multiple copies of a content item may be stored by the content sharing platform. The various copies may be of different aspect ratios. The version of the content item best suited to display by a device may be provided to the device. The content creator may generate different versions of the content item at a variety of aspect ratios for use in various types of displays.

Methods and systems of the present disclosure may address one or more shortcomings of conventional solutions. In some embodiments, a content item is provided to a content providing platform at an intended aspect ratio. The content item is further provided to a user device for display. The user device may have one or more usable displays, one or more display windows (e.g., areas of a display to be used in displaying the content item), one or more display configurations available, etc. One or more of various methods may be utilized in providing the content item to a user device, resizing or adapting the content to a target display or display window, etc.

In some embodiments, content may be provided to the user device via a scalable bitstream. A scalable bitstream may include a base layer and an enhancement layer. A device receiving a scalable bitstream may be configured to utilize the base layer and the enhancement layer to generate an enhanced content item at a target aspect ratio. For example, the base layer may include data associated with a spatial region of a content item, video, video frame, etc. The base layer may include data associated with a central region of a content item, a region of interest of a content item, etc. The enhancement layer may include data associated with one or more other spatial regions of the content item. The enhancement layer may be more highly compressed than the base layer, may occupy less storage space and/or transmission bandwidth than the base layer (per viewable area, for example), etc. The user device may perform one or more operations to expand content of the enhancement layer to generate the enhanced video at the target aspect ratio. For example, geometric prediction may be utilized in determining dimensions and placements of objects depicted in the content item. In another example, content adaptive warping may be utilized in generating the enhanced video, such as seam carving. The enhanced video may include a portion displayed, stored, and/or transmitted in high fidelity, and a portion in a lower fidelity.

In some embodiments, content items may be provided to a user device with resizing metadata signaling. Resizing metadata may include instructions for the user device to perform resizing to fit the content item to a target aspect ratio. Resizing metadata may include indications of cropping procedures, such as regions of interest that should not be cropped, a location that should be kept centered or kept in a particular position, etc. Resizing metadata may include indications of content adaptive warping. For example, metadata may include parameters to guide seam carving to generate content for display at a target aspect ratio.

In some embodiments, a content item may be provided to a user device via two bitstreams. Each bitstream may correspond to a different aspect ratio. For example, a first bitstream may correspond to a vertical orientation, and a second bitstream may correspond to a horizontal orientation. In some embodiments, the content item displayed at one orientation may include content that is also displayed when viewed in the second orientation. For example, a vertical orientation may display a central crop of a horizontal orientation. In some embodiments, portions of content may not be provided in connection with one orientation, one bitstream, one aspect ratio, or the like. For example, overlapping portions may only be provided in one bitstream, along with instructions to overlay content received via the other bitstream into spatial regions of the content associated with the first bitstream. In some embodiments, one bitstream may be of lower framerate, lower fidelity, lower resolution, or the like. For example, a content item may display a video in the vertical orientation, with static images enhancing the sides if viewed in a horizontal orientation.

Methods and systems of the present disclosure provide technical advantages over conventional solutions. A scalable bitstream enables the expansion of a content item provided to a user device to a variety of aspect ratios. A scalable bitstream may accomplish a similar result to providing a large content display area and cropping portions to fit a target aspect ratio, but with significant additional advantages over such a technique. A scalable bitstream enables less important portions of a content item to be represented with less expenditure of resources per display area. Less important areas may be represented with fewer pixels, bits, etc., per display area. Less important areas may be stored more efficiently and transmitted more efficiently than if the entire content item was to be stored and transmitted at a bitrate associated with the base layer of the scalable bitstream.

Retargeting of a content item may enable the content item to utilize as much display area as possible, improving a user experience. Proving metadata driving cropping operations (such as region of interest locations) may enable a content item to be displayed without removing the most important portions of the content item at a variety of aspect ratios. Adaptive resizing may be utilized to remove unimportant or uninteresting portions of the content item, from edges of the content or from less vital central portions of the content item via seam carving or other content adaptive warping techniques. Retargeting operations may enable a single copy of a content item and associated retargeting metadata to be stored, provided as a search result, transmitted to user devices, etc., while accommodating a variety of user devices, user device displays, display windows, user preferences, etc.

Dual bitstreams may enable delivery of content at multiple aspect ratios with increased efficiency compared to delivery of content at multiple aspect ratios separately or delivery of content at a single aspect ratio for later cropping. For example, two different decoding architectures may be utilized in decoding the two bitstreams, such as a video decoder and an image decoder. Storing, transmitting, receiving, and/or decoding redundant data may be avoided by providing instructions to overlay content from one bitstream over content from the second bitstream, while only providing the overlapping spatial portion of the content item in the first bitstream.

Various embodiments may improve efficiency of a content providing and/or viewing system. Embodiments may enable utilization of more of an available display or display window than some conventional solutions. Some embodiments may enable less dedicated storage space to account for various aspect ratios. Some embodiments may enable fewer operations and/or less computing power to be expended by a user device in displaying content items. Some embodiments may reduce a transmission, reception, and/or decoding data load on a server and user device to provide a content item. Some embodiments may enable utilization of multiple user device modules, such as image decoding and video decoding simultaneously, reducing processing time and/or freeing up processing power for additional operations. Some embodiments may provide for an improved energy expenditure by reducing computing and/or storage load. Some embodiments may provide for an improved content creation experience, e.g., by enabling delivery of multiple aspect ratios without specification of selected cropping windows by a content creator.

FIG. 1 illustrates an example system architecture 100 for receiving requests for content items for display at target display formats, according to some embodiments. System architecture 100 includes client device 110 (in some embodiments, more client devices may be included, e.g., devices 110B, 110C, etc.), one or more networks 105, and content platform system 102. Content platform system 102 includes one or more server machines 106, one or more data stores 140, and may include a variety of platforms targeted at performing tasks (e.g., tasks associated with content delivery). Platforms of content platform system 102 may be hosted by one or more server machines 106. Platforms of content platform system 102 may include and/or be hosted on one or more computing devices (such as a rackmount server, a router computer, a server computer, a personal computer, a mainframe computer, a laptop computer, a tablet computer, a desktop computer, etc.) and one or more data stores (e.g., hard disks, memories, and databases) and may be coupled to the one or more networks 105. In some embodiments, components of content platform system 102 (e.g., server machines 106, data stores 140, hardware associated with one or more platforms, etc.) may be directly connected to one or more networks 105. In some embodiments, one or more components of content platform system 102 may access networks 105 via another device, e.g., a hub, switch, etc. Data stores 140 may be included in one or more server machines 106, include external data storage, etc. Platforms of content platform system 102 may include advertisement platform 165, aspect ratio platform 160, recommendation platform 157, search platform 145, and content providing platform 120.

The one or more networks 105 may include one or more public networks (e.g., the Internet), one or more private networks (e.g., a local area network (LAN), a wide area network (WAN), one or more wired networks (e.g., Ethernet network), one or more wireless networks (e.g., an 802.11 network), one or more cellular networks (e.g., a Long Term Evolution (LTE) network), routers, hubs, switches, server computers, and/or a combination thereof. In some embodiments, some components of architecture 100 are not directly connected to each other. In some embodiments, system architecture 100 includes multiple separate networks 105.

The one or more data stores 140 may reside in memory (e.g., random access memory), cache, drives (e.g., hard drive), flash drives, etc., and may be part of one or more database systems, one or more file systems, or another type of component or device capable of storing data. The one or more data stores 140 may include multiple storage components (e.g., multiple drives or multiple databases) that may also span multiple computing devices (e.g., multiple server computers). The data store may be persistent storage that is capable of storing data. A persistent storage may be a local storage unit or a remote storage unit, electronic storage units (e.g., main memory), or a similar storage unit. Persistent storage may be a monolithic device or a distributed set of devices.

Content items 121A-C (e.g., media content items) may be stored on one or more data stores. The data stores may be part of one or more platforms. Examples of a content item 121 may include, and are not limited to, digital video, digital movies, animated images, digital photos, digital music, digital audio, digital video games, collaborative media content presentations, website content, social media updates, electronic books, electronic journals, digital audio books, web blogs, software applications, etc. Content items 121A-C may also be referred to as media items. Content items 121A-C may be pre-recorded or live-streamed. For brevity and simplicity, a video may be used as an example of a content item 121 throughout this document. Content items 121A-C may be recommended to a user, e.g., via recommendation platform 157. Content items 121A-C may be provided responsive to a user search, e.g., via search platform 145. Content items 121A-C may be provided along with one or more advertisements, e.g., via advertisement platform 165. Content items 121A-C may be provided at one or more aspect ratios. Operations associated with aspect ratio selection may be performed by aspect ratio platform 160. Operations associated with determining a delivery format and delivering one or more of content items 121A-C may be performed by delivery format manager 150 of server machine 106.

Data store 140 may further store advertisements, e.g., in association with advertisement platform 165. Advertisement storage may include storing advertisement text and images, storing entity association with advertisements, etc. Advertisements may be provided responsive to a user query. One or more advertisements may be provided as query results. In some embodiments, advertisements may be associated with operations related to aspect ratio platform 160 and; or delivery format manager 150. Advertisements may be considered to be content items, from the perspective of aspect ratio and delivery format operations.

Content items 121A-C may be provided by content providers. A content provider may be a user, a company, an organization, etc. A content provider may provide a content item 121 that is a video. A content provider may provide content item 121 that comprises live-streamed content, e.g., content item 121 may include live-streamed video, a live chat associated with the video, etc. Content providers may be provided as search results.

Client devices 110 may include devices, such as televisions, smart phones, personal digital assistants, portable media players, laptop computers, electronic book readers, tablet computers, desktop computers, gaming consoles, set-top boxes, or the like. Client devices 110 may include devices that are used to submit searches, receive search results, etc. Client devices 110 may include devices configured to receive content items from content platform system 102 (e.g., receive data that client device 110 may utilize to display the content item) and display the content items for one or more users.

A client device 110 (110B, 110C, etc.) may include a communication application 115. A content item 121 may be consumed by a user via the communication application 115. A request for content item 121 may be submitted to content platform system 102 via communication application 115. A content item 121 may be provided to a user via communication application 115 for display by the client device 110. For example, communication application 115 may access one or more networks 105 (e.g., the internet) via hardware of client device 110 to provide content item 121 to the user. As used herein, "media," "media item," "online media item," "digital media," "digital media item," "content," "media content item," and "content item" may include an electronic file that can be executed or loaded using software, firmware, and/or hardware configured to present a content item. In some embodiments, the communication application 115 may be an application that allow users to compose, send, and receive content items 121 (e.g., videos) over a platform (e.g., content sharing platform 120, recommendation platform 157, advertisement platform 165, aspect ratio platform 160, and/or search platform 145) and/or a combination of platforms and/or networks.

In some embodiments, the communication application 115 may be a social networking application, video sharing application, video streaming application, video game streaming application, photo sharing application, chat application, or an application performing a combination of such functions. The communication application 115 associated with client device 110 may render, display, present and/or play one or more content items 121 to one or more users. For example, communication application 115 may provide user interfaces 116 (e.g., a graphical user interface) to be displayed on client device 110 for requesting, receiving, displaying, and/or playing content items.

In some embodiments, communication application 115 may include content viewer 113. User interface 116 may display content viewer 113. Content viewer 113 may be used to display one or more content items provided via content platform system 102. Content viewer 113 may be used to display one or more results responsive to receiving a user query via user interface 116. Content viewer 113 may display content items as query match results. Content viewer 113 may display one or more advertisements as query match results.

Communication application 115 may further include display formatting component 114. Display formatting component 114 may be responsible for adapting content items provided by content platform system 102 to one or more displays and/or display windows of client device 110. Display formatting component 114 may provide data indicative of display settings to content platform system 102. Content platform system 102 may provide content formatted in accordance with the settings to client device 110. Display formatting component 114 may receive from content platform system 102 instructions related to adapting one or more content items to one or more displays or display windows of client device 110. Display formatting component 114 may enact instructions provided by content platform system 102 for displaying one or more content items. Display formatting component 114 may enact procedures to display a content item at a target aspect ratio.

In some embodiments, user interface 116 may include a search component, e.g., a field a user may utilize to search for target content item 121, a target content channel (e.g., channel A 125), any content item 121 associated with a target topic, etc. In some embodiments, a search component may provide a user with a virtual keyboard to facilitate user input. In some embodiments, multiple content viewers 113 may be associated with one user interface, communication application, client device, etc. For example, multiple content items may be displayed for a user at once. Multiple query results may be displayed for a user at once.

In some embodiments, client device 110 may be a device including a display, such as a laptop computer or smart phone. In some embodiments, client device 110 may be a device coupled to a display, such as a desktop computer coupled to a monitor or a gaming console coupled to a TV. Display formatting component 114 may enable display of a content item at an aspect ratio associated with the device display or device associated display. In some embodiments, client device 110 may be configured to display a content item in a display window. A display window may be a region of a display for displaying one or more content items. A display window may be a combination of displays, or a combination of portions of displays. A display window may be of a different aspect ratio than a display of client device 110. For example, a content item may be displayed in a square window on a smart phone display.

In some implementations, application 115 is a web browser that can access, retrieve, present, and/or navigate content (e.g., web pages such as Hyper Text Markup Language (HTML) pages, digital media items, etc.) and can include content viewer 113, which may be an embedded media player that is embedded in user interface 116 (e.g., a web page associated with viewing content) provided by content providing platform 120. Alternatively, application 115 is not a web browser and is a stand-alone application (e.g., mobile application, desktop application, gaming console application, television application, etc.), that is downloaded from a platform (e.g., content providing platform 120) or pre-installed on the client device 110. The stand-alone communication application 115 can provide user interface 116 including content viewer 113 (e.g., embedded media player).

In some embodiments, communication applications 115 installed on client devices 110 may be associated with a user account, e.g., a user may be signed in to an account on the client device 110. In some embodiments, multiple client devices 110 may be associated with the same client account. In some embodiments, operations of one or more platforms of content platform system 102 (e.g., aspect ratio platform 160, recommendation platform 157) may be performed responsive to the client devices being associated with a particular user account.

In some embodiments, client device 110 may include one or more data stores. Data stores may include commands (e.g., instructions, which cause operations when executed by a processing device) to render a UI (e.g., user interface 116). The instructions may include commands to render a content viewing UI component. The instructions may include commands to render a content item at a target format or target aspect ratio.

In some embodiments, the one or more server machines 106 may include computing devices such as rackmount servers, router computers, server computers, personal computers, mainframe computers, laptop computers, tablet computers, desktop computers, etc., and may be coupled to one or more networks 105. Server machines 106 may be independent devices or part of any of the platforms (e.g., content providing platform 120, social network platform 160, etc.).

In some embodiments, server machine 106 includes delivery format manager 150. Delivery format manager 150 may perform operations associated with providing data to enable presentation of content items at a target aspect ratio. Delivery format manager 150 may manage communication from a client device indicating a target aspect ratio for delivery of a content item. Delivery format manager 150 may manage communication to client device 110 including instructions for providing a content item at one or more aspect ratios, formats, etc. Delivery format manager 150 may include one or more sets of instructions for various delivery format options, delivery aspect ratio parameters, etc. Delivery format manager 150 may include instructions for various methods of aspect ratio matching. For example, a first client device 110A may be provided with content adjusted to a target aspect ratio using a first method of content item formatting, and a second client device 110B may be provided with content adjusted to a target aspect ratio using a second method of content item formatting. Determining which method of content format delivery to utilize may be based on capabilities of the client device, preferences of a user of content creator, the nature of the content item or associated parameters or metadata, etc.

Aspect ratio platform 160 may perform operations associated with generating and/or providing content items at one or more target aspect ratios. Aspect ratio platform 160 may perform operations associated with determining parameters for adjusting aspect ratios of content items. Aspect ratio platform 160 may manage user preferences, user selections of aspect ratio-related settings, etc. Aspect ratio platform 160 may manage content item parameters, parameters presented or selected by a content creator, etc. Aspect ratio platform 160 may enable and/or store data associated with one or more methods for adjusting delivery format or aspect ratio of content items. Methods for adjusting delivery format or aspect ratio delivery may include providing a scalable bitstream including a base and enhancement layer. Methods may include providing a bitstream with re-targeting metadata, such as region-of-interest metadata and content adaptive warping parameters. Methods may include providing multiple bitstreams for data associated with different aspect ratios.

Recommendation platform 157 may be used to generate and provide content recommendations (e.g., articles, videos, posts, news, games, etc.). Recommendations may be based on search history, content consumption history, followed/subscribed channel content, linked profiles (e.g., friend lists), popular content, etc. Recommendations may be based on a user's search history. Recommendations may include recommended queries, e.g., suggested topics, channels, etc.

Search platform 145 may be used to allow users to query the one or more data stores 140 and/or one or more platforms and receive search results. Advertisement platform 165 may be used to provide advertisements. Advertisements may be provided responsive to receiving a search from a user. The search may be a text search. The search may be user acceptance of a recommended query, e.g., based on a query suggested by recommendation platform 157.

Content providing platform 120 may be used to provide one or more users with access to content items 121 and/or provide the content items 121 to one or more users. For example, content providing platform 120 may allow users to consume, upload, download, and/or search for content items 121. In another example, the content providing platform 120 may allow users to evaluate content items 121, such as approve of ("like"), disapprove of, recommend, share, rate, and/or comment on content items 121. In another example, the content providing platform 120 may allow users to edit content items 121. The content providing platform 120 may also include a website (e.g., one or more webpages) and/or one or more applications (e.g., communication applications 115) that may be used to provide one or more users with access to the content items 121. For example, communication application 115 may be used by client device 110 to access content items 121. Content providing platform 120 may include any type of content delivery network providing access to content items 121.

Content providing platform 120 may include multiple channels (e.g., channel A 125, channel B 126, etc.). A channel may be a collection of content available from a common source, a collection of content having a common topic or theme, etc. A channel may be a collection of content generated by a content creator, e.g., a user who creates and/or provides content items. The data content of a channel may be digital content chosen by a user, digital content made available by a user, digital content uploaded by a user, digital content chosen by a content provider, digital content chosen by a broadcaster, etc. For example, channel A 125 may include two videos (e.g., content items 121A-B). A channel may be associated with an owner, who may be a user that can perform actions on the channel. The content may be one or more content items 121. The data content of the channels may be pre-recorded content, live content, etc. although channels are described as one implementation of a content providing platform, implementations of the disclosure are not limited to content sharing platforms that provide content items 121 via a channel model.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of one or more platforms, one or more content items, etc.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
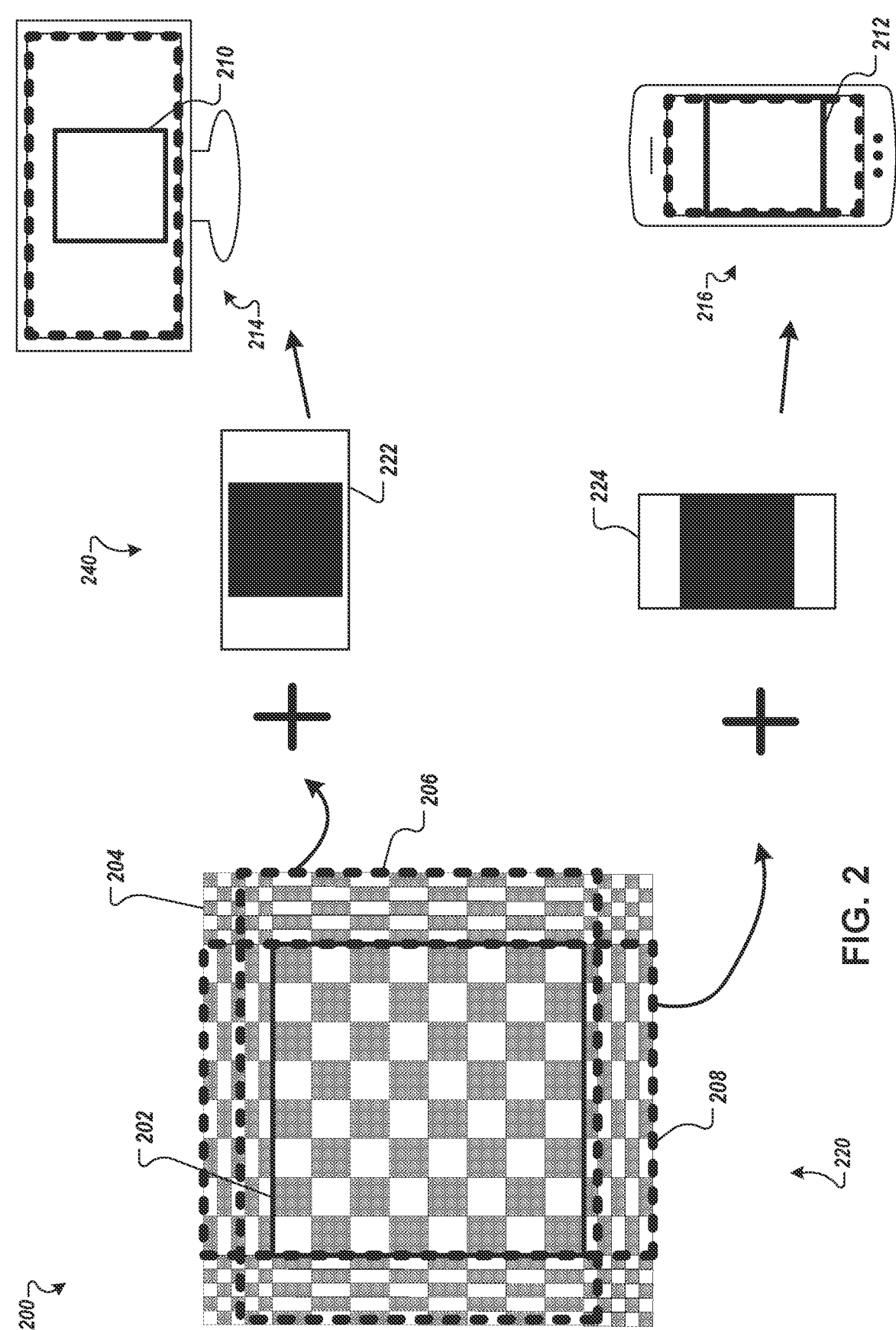
FIG. 2 is a representation of data for an scalable bitstream, including a base layer and an enhancement layer, according to some embodiments.

FIG. 2 is a representation of data for an scalable bitstream 200, including base layer 220 and enhancement layer 240. The size of regions of the checkerboard shape corresponds to data compression in those regions, fidelity of data in those regions, etc. Base layer 220 may include low fidelity regions and high fidelity regions, e.g., may represent certain spatial portions of a content item in a higher fidelity than other spatial portions of the content item. Base layer 220 includes high fidelity representation 202, which includes data to generate a high fidelity view of a portion of a content time. Base layer 220 includes low fidelity representation 204, which includes data that generates a lower fidelity display of a portion of a content time. High fidelity representation 202 and low fidelity portion 204 may differ in a level of compression applied to data associated with spatial regions or portions of a content item. Data associated with high fidelity representation 202 may be represented at a first quality (e.g., fidelity, resolution, level of compression, etc.). Data associated with low fidelity representation 204 may be represented at one or more other qualities, different than the first quality. Data of low fidelity representation 204 may include less data (e.g., fewer bits) per target display area than data of high fidelity representation 202.

Scalable bitstream 200 may be utilized in generating content items for display at various formats, aspect ratios, or the like. Scalable bitstream 200 may enable a first region of interest to be displayed at a high fidelity, high resolution, high frame rate, or the like. Scalable bitstream 200 may enable a second region to be displayed at a different (e.g., lower) quality than the first region, by one or more metrics. Scalable bitstream 200 may enable a client device to perform operations to improve a quality of the second region using an enhancement layer 240, e.g., to achieve comparable quality of various spatial portions when displaying a content item, media item, or the like.

Scalable bitstream 200 includes a horizontal region 206 and a vertical region 208. Horizontal region 206 and vertical region 208 are used as examples, and other delivery formats and/or aspect ratios are within the scope of this disclosure. In some embodiments, only high fidelity representation 202 may be used, e.g., for a target delivery format or delivery display. Horizontal region 206 may include data selected for use in displaying a content item (e.g., video) in a horizontal aspect ratio (e.g., an aspect ratio that is wider than tall). Vertical region 208 may include data selected for use in displaying a content item in a vertical aspect ratio (e.g., an aspect ratio that is taller than wide). Horizontal region 206 and vertical region 208 are example regions of scalable bitstream 200 that may be utilized for two target aspect ratios. For different target aspect ratios, different portions of data included in scalable bitstream 200 may be utilized. Any of a range of aspect ratios/content item formats may be targeted.

In some embodiments, a content providing platform may determine a region for display by a client device. The determination may be based on identifying the target display device, based on an indication received from the client device, or the like. The content providing platform may provide instructions directing which portions of the scalable bit stream the client device is to utilize. The content providing platform may provide data associated with the selected portions, and not provide other portions of the data (e.g., the content providing platform may provide the base layer 220 and a portion of the enhancement layer 240 related to the target aspect ratio).

In some embodiments, a client device may determine a portion of scalable bitstream 200 to utilize in displaying a content item. A client device may be provided with data corresponding to a larger spatial region than the client device is configured to display. The client device may be provided with data corresponding to a different shape, aspect ratio, format, etc., than the client device is configured to display. The client device may be provided with a complete scalable bitstream, e.g., the entirety of the bitstream stored by the content providing platform associated with a content item of the scalable bitstream. The client device may determine which portions of the bitstream to utilize in displaying the content item. For example, the client device may determine the boundaries of horizontal region 206 for displaying the content item.

In some embodiments, the client device may be provided with the entirety of base layer 220 and a portion of enhancement layer 240 appropriate for a target display format. In some embodiments, the client device may be provided with the entirety of base layer 220 and may select from provided enhancement layer 240 data which portions to utilize, in accordance with the target display format. In some embodiments, a client device may display portions of the content item associated with base layer 220 without portions associated with enhancement layer 240, e.g., for delivery/display formats that include only portions associated with high fidelity representation 202.

Data of low fidelity representation 204 may be expanded for displaying a content item. Data of low fidelity representation 204 may be expanded for fitting the content item to a desired aspect ratio, format, etc. Data of low fidelity representation 204 may be expanded by a client device for display of a content item. Data of low fidelity representation 204 may be expanded by one or more predictive methods to generate a full spatial region based on a less complete set of data of low fidelity representation 240. Data of low fidelity representation 204 may be expanded using device-specific targeting.

Data of low fidelity representation 204 may be expanded for display via geometric prediction. Geometric prediction refers to the process of making predictions about the geometry or shape of objects in an image or video. This can involve predicting the location, size, and orientation of objects in a scene, as well as predicting the shape and appearance of those objects under different lighting or viewing conditions. Geometric prediction can involve using machine learning algorithms to analyze the geometry and other features of the objects in a scene, and then using this information to predict the location and size of these objects. A client device may predict the size, shape, and locations of objects included in data of low fidelity representation 204. Predictions of objects of a content item may be used to generate a spatial portion of a rendered content item corresponding to low fidelity representation 204.

Data of low fidelity representation 204 may be expanded for display via content adaptive warping. Content adaptive warping is a technique used in image and video processing that allows for the efficient and effective removal of geometric distortions or warps. It works by adaptively adjusting the warping function based on the content of the image or video being processed. Content adaptive warping allows for a more flexible warping function than some conventional methods. A warping function of a content adaptive warping procedure may be adjusted based on the local features of the image, video, content item, or the like. Performing content adaptive warping may involve dividing an image or video into small regions and computing a local warping function for each region. The warping function is then used to map the pixels in each region to their corresponding locations in the output image. The local warping functions are computed using a combination of global and local image features, such as edge direction, texture, and color. This allows for a more accurate and precise warping function that better preserves the underlying content of the image or video.

Data of low fidelity representation 204 may be expanded for display via seam carving. Seam carving is a technique used in image processing to resize an image while preserving its important features. The technique works by identifying and removing seams of pixels that contain the least important content in the image. A seam is defined as a connected path of pixels that spans the width or height of the image. The seam is identified by computing a score for each pixel in the image, based on its importance or relevance to the overall content of the image. The score is typically computed based on a combination of factors, such as the pixel's color, contrast, and texture, as well as its position relative to other pixels in the image. Once the scores have been computed, the seam with the lowest total score is identified and removed from the image. This process is repeated iteratively, with each iteration removing the seam with the lowest score, until the desired size of the image has been reached. Seam carving may be utilized in rendering a content item based on scalable bitstream 200 by determining one or more images and performing seam carving to reduce one dimension of the image repeatedly until a target aspect ratio is achieved. A seam carving-like technique may be utilized in expanding a content item from a base layer portion into an enhancement layer portion by calculating seams of a highest importance from data of an enhancement layer and adding these seams into the content item for display.

In some embodiments, resizing operations performed by a client device may be guided. For example, one or more parameters of content adaptive warping or of geometric prediction operations may be provided to the client device by the content providing platform.

Scalable bitstream 200 as an example depicts a square high fidelity representation 202 and larger square frame-shaped low fidelity representation 204, with horizontal region 206 and vertical region 208 being rectangles. Any of these regions may be differently shaped for a particular content item, particular portion of a content item, particular content channel or content platform, etc. For example, high fidelity representation 202 may correspond to a circular or elliptical display region, and a region taken for display may display at any shape, format, or aspect ratio, such as a circular display window.

High fidelity representation 202 may include data associated with a spatial region of a content item. High fidelity representation 202 may represent a region of interest of the content item, a central region of the content item, or the like. High fidelity representation 202 may correspond to a spatial region of a display of a content item. Data of high fidelity representation 202 may be represented in display portions 210 and 212. Portions of data associated with low fidelity representation 204 may be represented in portions of a display and/or display window outside a portion connected to high fidelity representation 202. For example, regions outside of display portions 210 and 212 may be associated with low fidelity representation 204.

Data of scalable bitstream 200 may be utilized in displaying a content item. A selected portion of scalable bitstream 200 may correspond to a target content item delivery format, aspect ratio, size and shape, or the like. Horizontal region 206 may be utilized in generating content on a horizontal display 214. Vertical region 208 may be utilized in generating content on a vertical display 216. Other portions of scalable bitstream 200 may correspond to other display formats, display window formats, etc.

Based on data provided in base layer 220, a client device may generate a representation that is of high fidelity in a first spatial portion and of low fidelity in a second spatial portion. the high fidelity portion may be associated with high fidelity representation 202, and the low fidelity portion may be associated with low fidelity representation 204.

A client device may further receive enhancement layer 240. A content providing platform may store base layers and enhancement layers associated with various content items. A content providing platform may provide base layers and enhancement layers to client devices. A client device may utilize data of the base layer and one or more enhancement layers to display a content item. A content providing platform may store a single base layer and multiple enhancement layers for different delivery formats, which may provide storage savings.

A client device may utilize data of an enhancement layer to improve fidelity of a spatial portion corresponding to low fidelity representation 204. For example, data of a horizontal enhancement layer 222 may provide additional information for increasing the fidelity of a portion for display outside the portion associated with high fidelity representation 202. Data of horizontal enhancement layer 222 may provide data for increasing a quality of display of a portion outside a region associated with high fidelity representation 202. Vertical enhancement layer 224 may provide similar functionality. In some embodiments, enhancement layer 240 may provide data to reduce or remove a difference in quality between portions of a displayed content item associated with high fidelity representation 202 and low fidelity representation 204. enhancement layer 240 may provide data to augment a representation generated by performing seam carving, content adaptive warping, geometric prediction, and/or other image processing techniques on low fidelity representation 204. In some embodiments, enhancement layer 240 may provide data that fills a gap between presentation of content associated with high fidelity representation 202 and presentation of content associated with low fidelity representation 204.

A base layer 220 of a content item may include a high fidelity portion and a low fidelity portion. A base layer 220 of a content item may include a high resolution portion and a low resolution portion. A base layer 220 of a content item may include a high frame rate portion and a low frame rate portion. A base layer 220 of a content item may include a region produced at a high quality and a region produced at a lower quality. The high quality spatial region may correspond to high fidelity representation 202. The high quality spatial region of a base layer display may include display portion 210, display portion 212, etc. In some embodiments, an entire spatial region corresponding to high fidelity representation 202 may be displayed, as in horizontal display 214 and vertical display 216. In some embodiments, a spatial region corresponding to high fidelity representation 202 may be surrounded by a second region, as depicted in horizontal display 214. In some embodiments, a spatial region corresponding to high fidelity representation 202 may be partially surrounded by a second region corresponding to a portion of enhancement layer 240, as depicted in vertical display 216. In some embodiments, a spatial portion corresponding to high fidelity representation 202 may be displayed in the center of a display or display window, as depicted in vertical display 216. In some embodiments, a spatial portion corresponding to high fidelity representation 202 may be displayed off-center of a display or display window in one or more directions, as depicted in horizontal display 214. In some embodiments, an entirety of a spatial region of a content item corresponding to high fidelity representation 202 may be displayed, and an entirety of a spatial region corresponding to one of the enhancement layers 240 may be displayed. In some embodiments, a portion of a spatial region corresponding to an enhancement layer 240 may be displayed, as depicted in horizontal display 214 and vertical display 216. In some embodiments, a portion of a spatial region corresponding to high fidelity representation 202 may be displayed.

Figure 3:
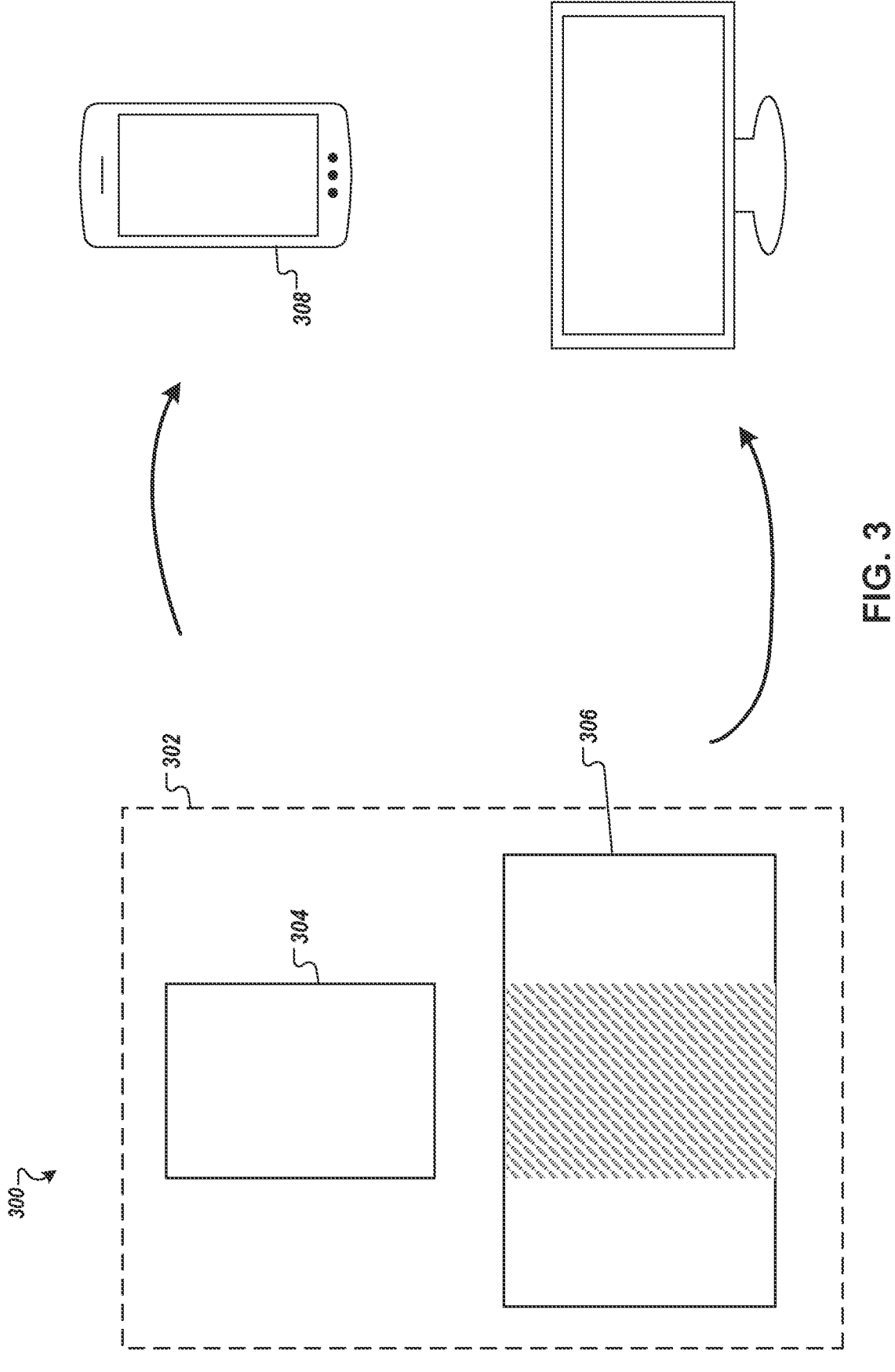
FIG. 3 is a representation of dual bitstream operations for providing a content item at a target delivery format, according to some embodiments.

FIG. 3 is a representation of dual bitstream operations 300 for providing a content item at a target delivery format, according to some embodiments. Dual bitstream operations 300 include providing a set of data (as depicted by data representation 302) including two bitstreams. The first bitstream includes data (shown as data representation 304) associated with a first content item delivery format. The second bitstream includes data (shown as data representation 306) associated with a second content item delivery format. For example, the first bitstream may be associated with a first orientation or aspect ratio, and the second bitstream may be associated with a second orientation or aspect ratio.

For a client device configured to display content in a format corresponding to or approximately corresponding to the format of data representation 304, the client device may utilize the bitstream associated with data representation 304 to receive the content item. For example, the first bitstream may include data associated with a content item in a vertical orientation, and client device 308 may display data from the first bitstream.

For a client device configured to display content in a different format, any appropriate previously discussed techniques may be utilized in adapting content to the target format. For example, targeted cropping, content adaptive warping, seam carving, etc., may be utilized in displaying the content item in a target format.

For a client device configured to display content in a format corresponding or approximately corresponding to the format associated with data representation 306, the client device may utilize the first and the second bitstream to receive the content item. The first bitstream may include content to be displayed in a first spatial portion of the display or display window, and the second bitstream may include content to be displayed in a second spatial portion of the display or display window. In some embodiments the client device may overlay content of the first bitstream over content of the second bitstream. In some embodiments, content of the second bitstream that is intended to be overlaid beneath other content (e.g., from the first bitstream) may be generated and/or transmitted at a lower bitrate, e.g., bits may be allocated to regions different than the overlay region.

In some embodiments, the second bitstream (e.g., the horizontal bitstream of FIG. 3) may serve as background to the main content, contained in the first bitstream. In some embodiments, the second bitstream may fill in borders around content of the first bitstream. In some embodiments, the second bitstream may be at a lower bitrate than the first bitstream (e.g., less data per spatial viewing area).

In some embodiments, the client device may decode the first and second bitstream simultaneously. The client device may decode the first and second bitstream utilizing different architectures, different modules, different hardware, or the like. For example, the client device may decode the first bitstream using a first decoder and the second bitstream using a second decoder. In some embodiments, content of the first bitstream may be video content and may be decoded by a video decoder of the client device, and content of the second bitstream may be still images and may be decoded by an image decoder of the client device. The content item for display may be a composite content item generated by compositing content from the first bitstream with content from the second bitstream.

In some embodiments, the client device may receive both bitstreams. The first bitstream may include a foreground portion of the content item and the second bitstream may include a background portion of the content item. Associated metadata may also be received via one or both bitstreams. The client device may decode both bitstreams. The client device may decode both bitstreams simultaneously. The client device then may compose video output. Metadata may be utilized in generating the composed output. For example, a position to overlay the foreground portion over the background portion may be specified by the metadata. In some embodiments, boundaries between the background and foreground regions may be blended, as specified by the metadata. In some embodiments, background and foreground regions may be composited in a different fashion, such as adding or averaging overlapping pixels between the foreground and background regions, adding or averaging pixels from certain portions of the foreground and background regions, or the like.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

FIG. 4 is a flow diagram of a method 400 for utilizing a dual bitstream to provide content in multiple delivery formats, according to some embodiments. Method 400 may be performed by processing logic that may include hardware (circuitry, dedicated logic, etc.), software (e.g., instructions run on a processing device), or a combination thereof. In one implementation, some or all the operations of methods 400 may be performed by one or more components of system 100 of FIG. 1. In at least one embodiment, some or all of the operations of method 400 can be performed by a user device (e.g., client device 110), as described above.

At block 402, a user device receives a first bitstream. The first bitstream includes data corresponding to a video for display at a first delivery format, such as a first aspect ratio. In some embodiments, the first bitstream may be associated with a content item that is not a video, such as an image. The first bitstream may correspond to a first orientation, such as a vertical orientation, for viewing a content item. The first bitstream may provide a content item (or a portion of a content item) at a target quality. Quality of the content item may include measures such as fidelity, resolution, frame rate, etc. The first bitstream may further include metadata. The metadata may include instructions directing the user device in displaying the video. The metadata may include parameters used in displaying the content item. The metadata may include parameters used in altering a display format of the content item from the format implied by the first bitstream. For example, the metadata may include targeting data, cropping data, region of interest data, adaptive warping parameters, seam carving parameters, etc. The metadata may include instructions for compositing a content item based on the data of the first bitstream.

At block 404, processing logic (e.g., of the user device) receives a second bitstream. The second bitstream includes data corresponding to the video (or the content item) associated with the first bitstream. The second bitstream may be associated with a second delivery format, a second aspect ratio, or the like. The second bitstream may be associated with a horizontal orientation for rendering of the content item. In some embodiments, the second bitstream may include associated metadata. Metadata of the second bitstream may share one or more features with metadata that may be included with the first bitstream. Metadata of the second bitstream may, for example, provide parameters or instructions for delivery format adjustment, content item compositing, etc. Metadata may include instructions for compositing content associated with the two bitstreams. Metadata may include instructions for overlaying one or more portions of content from one bitstream over portions of content from the other bitstream. In some embodiments, metadata may include indications for compositing content, such as an indication that a boundary between content associated with the two bitstreams is to be blended, smoothed, or the like.

At block 406, processing logic (e.g., of the user device) provides the first bitstream to a first bitstream decoder and the second bitstream to a second bitstream decoder, different than the first bitstream decoder. Operations of the first bitstream decoder in decoding the first bitstream and operations of the second bitstream decoder in decoding the second bitstream may overlap in time. Decoding the bitstreams may include utilizing parallel decoding architecture. For example, one bitstream may be decoded by a software decoder, while the other bitstream is decoded by a hardware decoder component. One bitstream may be decoded by a video decoder and another bitstream decoded by an image decoder, e.g., if one bitstream comprises one or more static images for display as part of the content item. In some embodiments, one decoder may be utilized. In some embodiments, bitstreams or portions of bitstreams may be decoded sequentially.

At block 408, processing logic (e.g., of the user device) determines whether to display the video at the first aspect ratio or the second aspect ratio. In some embodiments, processing logic may determine to display a content item at a target format. Processing logic may determine that a content item is to be displayed in a target display format. The target display format may be associated with content delivered by one of the two bitstreams. The target display format may be of a different format than indicated by either of the bitstreams, and additional techniques may be employed to achieve the target display format. Determining a target display format may inform a selection of portions of a content item associated with the first and second bitstreams to display. In some embodiments, the user device may be configured to display content items in multiple delivery formats. For example, the user device may be a smart phone, which is able to display content in a vertical or horizontal orientation, depending on an orientation of the device. Determining a delivery format may include receiving an indication of a user selection of a mode of display, such as a vertical mode or horizontal mode. In some embodiments, a first mode of display may correspond to a first bitstream, and a second mode of display may correspond to a second bitstream. In some embodiments, one or more of the modes of display may not exactly correspond to a delivery format of a bitstream, and the user device may perform further techniques to achieve a target display format.

At block 410, responsive to determining that the video is to be displayed at the second aspect ratio, processing logic (e.g., of the user device) composites video associated with the first bitstream and video associated with the second bitstream to generate a composited video. In some embodiments, processing logic may composite content of the first bitstream and content of the second bitstream to generate a composited content item. In some embodiments, the user device may determine that the content item is to be displayed in a format different from the delivery format associated with the first or second bitstreams.

In some embodiments, compositing the video includes overlaying at least a portion of video received in the first bitstream with video received in the second bitstream. Compositing a content item may include overlaying at least a portion of content included in the first bitstream with content included in the second bitstream. The overlaying may be an opaque overlay, e.g., content received from one bitstream may completely obscure a region of content from the other bitstream. Compositing may be performed in view of metadata received in the first bitstream, second bitstream, or both bitstreams. Metadata may indicate a location to overlay content.

In some embodiments, content from one bitstream includes visual content, such as an image or video. In some embodiments, a portion of the visual space of the content associated with this bitstream may not be intended to be displayed. For example, the first bitstream may include video, and the second bitstream may include a visual framing around the video of the first bitstream. A portion of a display area of the second bitstream may be intended to be overlaid by content of the first bitstream, and not displayed. The bitstream associated with the partially obscured content may be reduced in size by dedicating few bits to the area of the display that is to be obscured by content from the other bitstream (e.g., fewer bits than are used to encode the overlaying content).

At block 412, processing logic (e.g., of the user device) displays the composited video. In some embodiments, processing logic may display a composited content item other than a video. The composited content item may include overlaying content received in the first bitstream over content received in the second bitstream. The composited content may include smoothed or blended borders, e.g., between content associated with the two bitstreams. The composited content may be displayed using a first portion of a user device display. The first portion may be an entire display device, a display window, etc. The first portion may include a second portion and a third portion. The second portion may display content received as part of one of the received bitstreams, and the third portion may display content received as part of the other bitstream. For example, the second portion may be a central portion that displays content received as part of the first bitstream, and the third portion may be an outer portion that displays content received as part of the second bitstream. Data from one bitstream may be of a different quality than data from the other bitstream. For example, data from the second bitstream may be of lower fidelity, resolution, or frame rate than data from the first bitstream. Data from one bitstream may be video content, and data from the other bitstream may be one or more images to be displayed along with the video content.

Figure 5:
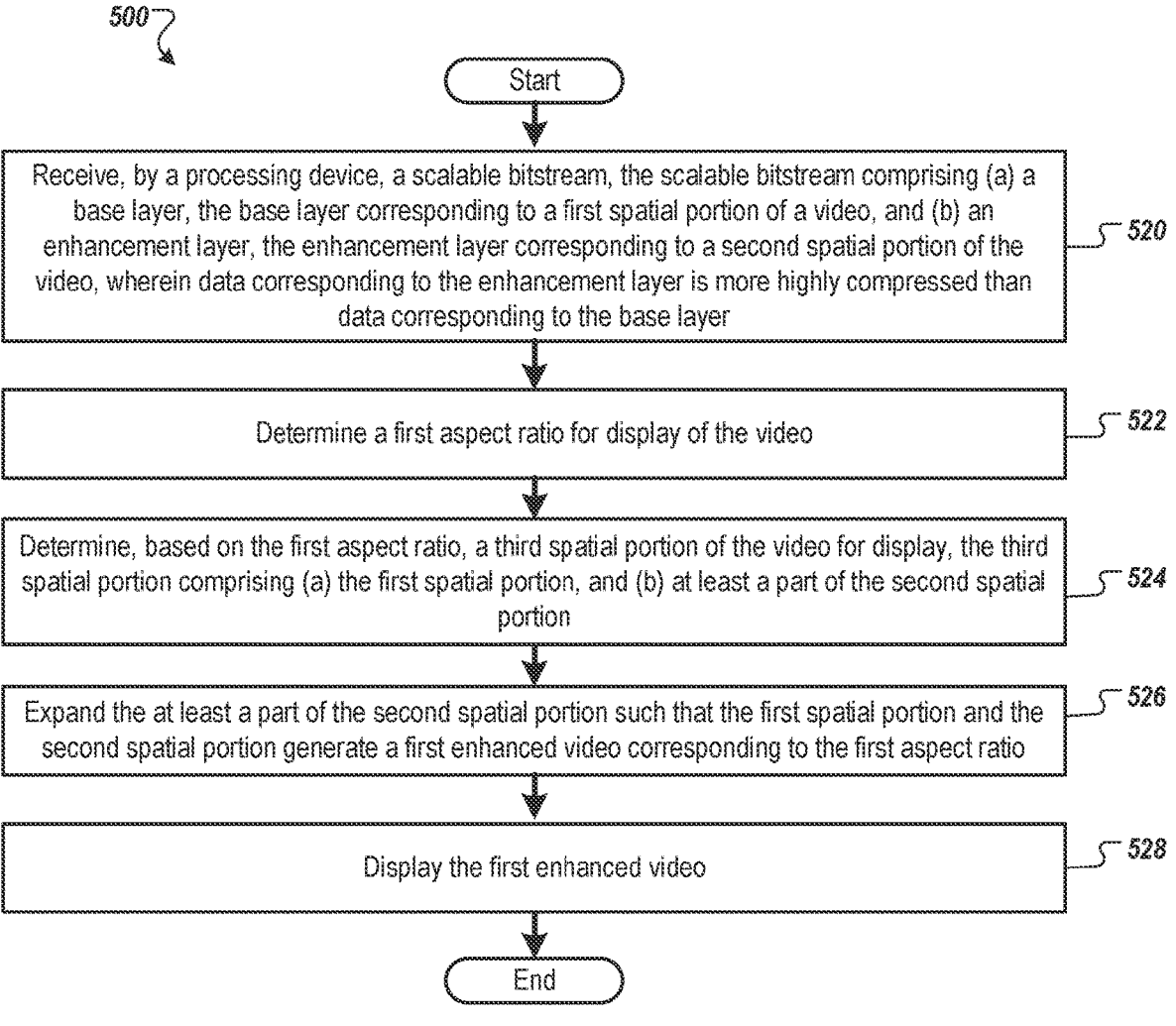
FIG. 5 is a flow diagram of a method for displaying a content item based on a bitstream including a base layer and an enhancement layer, according to some embodiments.

FIG. 5 is a flow diagram of a method 500 for displaying a content item based on a bitstream including a base layer and an enhancement layer, according to some embodiments. Method 500 may be performed by processing logic that may include hardware (circuitry, dedicated logic, etc.), software (e.g., instructions run on a processing device), or a combination thereof. In one implementation, some or all the operations of methods 500 may be performed by one or more components of system 100 of FIG. 1. In at least one embodiment, some or all of the operations of method 400 can be performed by a user device (e.g., client device 110), as described above.

At block 520, processing logic receives a scalable bitstream. The scalable bitstream includes a base layer and an enhancement layer. The base layer corresponds to a first spatial portion of a video or content item. The enhancement layer corresponds to a second spatial portion of the video or content time. Data corresponding to the enhancement layer is more highly compressed than data corresponding to the base layer (e.g., fewer bits per represented display area).

At block 522, processing logic determines a first aspect ratio for display of the video. Processing logic may determine a first display format for a content item, e.g., in a shape other than a rectangle. Determining the first aspect ratio may be based on a target display device, target display window, etc. A device may be configured to select between multiple display formats. Determining the first display format may include receiving an indication of a selected display format (e.g., aspect ratio). In some embodiments, a user input may indicate an adjustment of a selected display format. Operations described in method 500B may be updated based on the adjustment.

At block 524, processing logic determines, based on the aspect ratio for display of the content time, a third spatial portion of the video for display. The third spatial portion includes the first spatial portion (e.g., the spatial portion associated with the base layer). The third spatial portion includes at least a part of the second spatial portion (e.g., the spatial portion associated with the enhancement layer).

At block 526, processing logic expands the at least a part of the second spatial portion such that the first spatial portion and the second spatial portion generate a first enhanced video corresponding to the first aspect ratio. Expanding the at least a part of the second spatial portion may include determining additional content, objects, pixels, or the like to display beyond what is included in the enhancement layer. For example, expanding the at least a part of the second spatial portion may include inferring additional information, increasing a frame rate or resolution, expanding space between pictured objects, etc. Expanding the at least a part of the second spatial portion may include performing geometric prediction operations to generate content for display. Expanding the at least a part of the second spatial portion may include performing content adaptive warping such as seam carving. Expanding the at least a part of the second spatial portion may include expanding the second spatial portion beyond a target size, and using seam carving operations to reduce the content item to a target delivery format, aspect ratio, or the like.

At block 528, processing logic causes the first enhanced video to be displayed. In some embodiments, upon user selection of a different aspect ratio or delivery format, a user device may calculate a different enhanced video for display at the updated aspect ratio or display format. The first enhanced video may include a high-fidelity spatial portion and a low-fidelity spatial portion. The first enhanced video may include a high quality spatial portion and a low quality spatial portion. The high-fidelity or high quality spatial portion may be associated with the base layer and the low-fidelity or low quality spatial portion may be associated with the enhancement layer. The high quality portion may be displayed in a central portion of the display or display window, and the low quality portion may be displayed in a peripheral portion of the display or display window. Quality may include fidelity, resolution, frame rate, etc.

Figure 6:
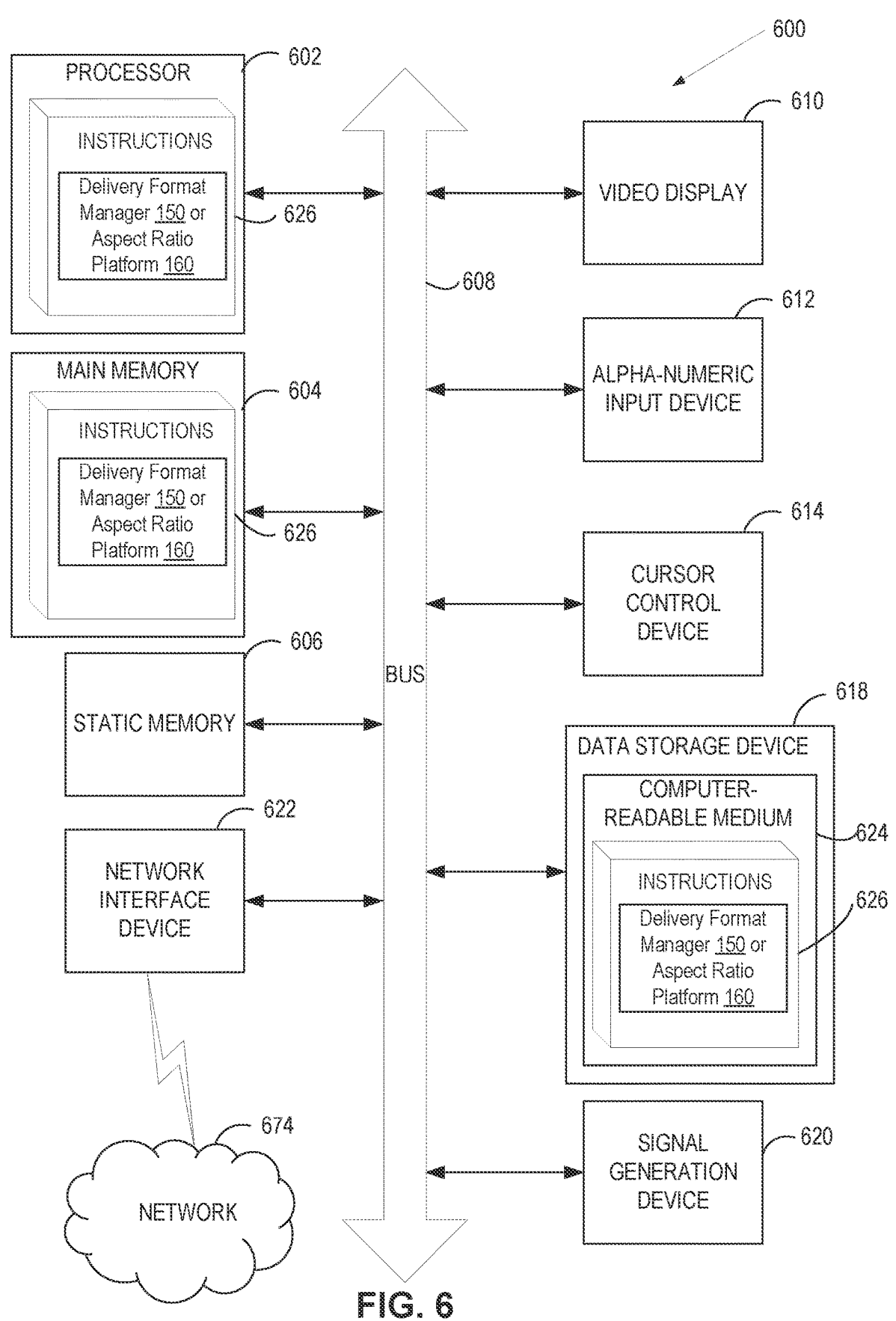
FIG. 6 is a block diagram illustrating an exemplary computer system, according to some embodiments.

FIG. 6 is a block diagram illustrating an exemplary computer system 600, according to some embodiments. Computer system 600 may be one of server machines 106 or client device 110 of FIG. 1. The machine may operate in the capacity of a server or an endpoint machine in an endpoint-server network environment, or as a peer machine in a peer-to-peer (or distributed) network environment. The machine may be a television, a personal computer (PC), a tablet PC, a set-top box (STB), a Personal Digital Assistant (PDA), a cellular telephone, a web appliance, a server, a network router, switch, or bridge, a gaming console, a digital media streaming device, or any machine capable of executing a set of instructions (sequential or otherwise) that specify actions to be taken by that machine. Further, while only a single machine is illustrated, the terms "machine," "computer," "processing device," etc., shall also be taken to include any collection of machines that individually or jointly execute a set (or multiple sets) of instructions to perform any one or more of the methodologies discussed herein.

Example computer system 600 includes a processing device (processor) 602, a volatile memory 604 (e.g., read-only memory (ROM), flash memory, dynamic random access memory (DRAM) such as synchronous DRAM (SDRAM), double data rate (DDR SDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 602 may also be one or more special-purpose processing devices such as an application specific integrated circuit (ASIC), a field programmable gate array (FPGA), a digital signal processor (DSP), network processor, or the like. The processor 602 includes processing instructions 626 (e.g., for facilitating target content item format delivery, content item format display, etc.) for performing operations discussed herein. Instructions 626 may be configured be enacted by processing logic. Instructions 626 may include instructions for performing operations associated with delivery format manager 150, or aspect ratio platform 160. In some embodiments, computer system 600 may be a client device, and instructions 626 may be used in enacting operations of communication application 115, display formatting component 114, and/or content viewer 113 of FIG. 1.

Computer system 600 can further include a network interface device 622. The computer system 600 also can include a video display unit 610 (e.g., a liquid crystal display (LCD) or a cathode ray tube (CRT)), an alpha-numeric input device 612 (e.g., a keyboard, and alphanumeric keyboard, a motion sensing input device, touch screen), a cursor control device 614 (e.g., a mouse), and a signal generation device 620 (e.g., a speaker).

Data storage device 618 can include a non-transitory machine-readable storage medium 624 (also computer-readable storage medium) on which is stored one or more sets of instructions 626 (e.g., for performing content item display/delivery formatting operations) embodying any one or more of the methodologies or functions described herein. The instructions can also reside, completely or at least partially, within the volatile memory 604 and/or within the processor 602 during execution thereof by the computer system 600, the volatile (e.g., main) memory 604 and the processor 602 also constituting machine-readable storage media. The instructions can further be transmitted or received over a network 674 via the network interface device 622.

While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/ or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities.

What is claimed is:

1. A method, comprising:

receiving, by a user device, a first bitstream comprising data corresponding to a media item, for display at a first aspect ratio, wherein the first bitstream corresponding to the first aspect ratio is received from a content platform via a network;

receiving, by the user device, a second bitstream comprising data corresponding to the media item, for display at a second aspect ratio, wherein the second bitstream corresponding to the second aspect ratio is received from the content platform via the network;

providing the first bitstream corresponding to the first aspect ratio to a first bitstream decoder and the second bitstream corresponding to the second aspect ratio to a second bitstream decoder, wherein operations of the first bitstream decoder in decoding the first bitstream corresponding to the first aspect ratio and operations of the second bitstream decoder in decoding the second bitstream corresponding to the second aspect ratio overlap in time;

determining whether to display the media item at the first aspect ratio or the second aspect ratio using user selection of the first aspect ratio or the second aspect ratio;

responsive to determining that the media item is to be displayed at the second aspect ratio, generating a composited media item based on the first bitstream corresponding to the first aspect ratio and the second bitstream corresponding to the second aspect ratio, wherein the second bitstream provides content to fill display regions outside the first aspect ratio; and displaying the composited media item.

2. The method of claim 1, wherein generating the composited media item comprises overlaying at least a portion of the media item received in the first bitstream with the media item received in the second bitstream.

3. The method of claim 1, wherein at least one of the first bitstream or the second bitstream further comprises metadata comprising media item compositing parameters, and wherein generating the composited media item is performed in view of the metadata.

4. The method of claim 3, wherein the metadata comprises an indication of a location for overlaying a first portion of media item data over a second portion of media item data.

5. The method of claim 3, wherein the metadata comprises an indication that a boundary between a first region of the composited media item corresponding to the first bitstream and a second region of the composited media item corresponding to the second bitstream is to be blended.

6. The method of claim 1, wherein:

a first portion of a display of the user device is utilized in displaying the composited media item;

the first portion of the display comprises a second portion, wherein the second portion of the display is utilized in displaying portions of the composited media item corresponding to data provided by the first bitstream;

data of the second bitstream comprises media corresponding to the first portion of the display; and data of the second bitstream corresponding to the second portion of the display comprises fewer bits than the first bitstream.

7. The method of claim 1, wherein the user device is configured to display media content in a first mode corresponding to the first aspect ratio and a second mode corresponding to the second aspect ratio, and wherein determining whether to display the media item at the first aspect ratio or the second aspect ratio further comprises determining user selection of the first mode or the second mode.

8. The method of claim 1, wherein the composited media item comprises a first portion associated with the first bitstream, and a second portion associated with the second bitstream, and wherein the second portion is of a lower resolution than the first portion.

9. The method of claim 1, wherein the composited media item comprises a first portion associated with the first bitstream, and a second portion associated with the second bitstream, and wherein the second portion is of a lower frame rate than the first portion.

10. A non-transitory machine-readable storage medium storing instructions which, when executed, cause a processing device to perform operations comprising:

receiving, by a user device, a first bitstream comprising data corresponding to a media item, for display at a first aspect ratio, wherein the first bitstream corresponding to the first aspect ratio is received from a content platform via a network;

receiving, by the user device, a second bitstream comprising data corresponding to the media item, for display at a second aspect ratio, wherein the second bitstream corresponding to the second aspect ratio is received from the content platform via the network;

providing the first bitstream corresponding to the first aspect ratio to a first bitstream decoder and the second bitstream corresponding to the second aspect ratio to a second bitstream decoder, wherein operations of the first bitstream decoder in decoding the first bitstream corresponding to the first aspect ratio and operations of the second bitstream decoder in decoding the second bitstream corresponding to the second aspect ratio overlap in time;

determining whether to display the media item at the first aspect ratio or the second aspect ratio using user selection of the first aspect ratio or the second aspect ratio;

responsive to determining that the media item is to be displayed at the second aspect ratio, generating a composited media item based on the first bitstream corresponding to the first aspect ratio and the second bitstream corresponding to the second aspect ratio, wherein the second bitstream provides content to fill display regions outside the first aspect ratio; and displaying the composited media item.

11. The non-transitory machine-readable storage medium of claim 10, wherein:

a first portion of a display of the user device is utilized in displaying the composited media item;

the first portion of the display comprises a second portion, wherein the second portion of the display is utilized in displaying portions of the composited media item corresponding to data provided by the first bitstream;

data of the second bitstream comprises media corresponding to the first portion of the display; and data of the second bitstream corresponding to the second portion of the display comprises fewer bits than the first bitstream.

12. The non-transitory machine-readable storage medium of claim 10, wherein the user device is configured to display media content in a first mode corresponding to the first aspect ratio and a second mode corresponding to the second aspect ratio, and wherein determining whether to display the media item at the first aspect ratio or the second aspect ratio further comprises determining user selection of the first mode or the second mode.

13. The non-transitory machine-readable storage medium of claim 10, wherein the composited media item comprises a first portion associated with the first bitstream, and a second portion associated with the second bitstream, and wherein the second portion is of a lower frame rate than the first portion.

14. A system for a user device, the system comprising:

a memory; and a processing device, coupled to the memory, to perform operations comprising:

receiving a first bitstream comprising data corresponding to a media item, for display at a first aspect ratio, wherein the first bitstream corresponding to the first aspect ratio is received at the user device from a content platform via a network;

receiving a second bitstream comprising data corresponding to the media item, for display at a second aspect ratio, wherein the second bitstream corresponding to the second aspect ratio is received at the user device from the content platform via the network;

providing the first bitstream corresponding to the first aspect ratio to a first bitstream decoder and the second bitstream corresponding to the second aspect ratio to a second bitstream decoder, wherein operations of the first bitstream decoder in decoding the first bitstream corresponding to the first aspect ratio and operations of the second bitstream decoder in decoding the second bitstream corresponding to the second aspect ratio overlap in time;

determining whether to display the media item at the first aspect ratio or the second aspect ratio using user selection of the first aspect ratio or the second aspect ratio;

responsive to determining that the media item is to be displayed at the second aspect ratio, generating a composited media item based on the first bitstream corresponding to the first aspect ratio and the second bitstream corresponding to the second aspect ratio, wherein the second bitstream provides content to fill display regions outside the first aspect ratio; and displaying the composited media item.

15. The system of claim 14, wherein generating the composited media item comprises overlaying at least a portion of the media item received in the first bitstream with the media item received in the second bitstream.

16. The system of claim 14, wherein at least one of the first bitstream or the second bitstream further comprises metadata comprising media item compositing parameters, and wherein generating the composited media item is performed in view of the metadata.

17. The system of claim 16, wherein the metadata comprises at least one of an indication of a location for overlaying a first portion of media item data over a second portion of media item data, or an indication that a boundary between a first region of the composited media item corresponding to the first bitstream and a second region of the composited media item corresponding to the second bitstream is to be blended.

18. The system of claim 14, wherein:
a first portion of a display of the user device is utilized in displaying the composited media item;
the first portion of the display comprises a second portion, wherein the second portion of the display is utilized in displaying portions of the composited media item corresponding to data provided by the first bitstream;
data of the second bitstream comprises media corresponding to the first portion of the display; and data of the second bitstream corresponding to the second portion of the display comprises fewer bits than the first bitstream.

19. The system of claim 14, wherein the user device is configured to display media content in a first mode corresponding to the first aspect ratio and a second mode corresponding to the second aspect ratio, and wherein determining whether to display the media item at the first aspect ratio or the second aspect ratio further comprises determining user selection of the first mode or the second mode.

20. The system of claim 14, wherein the composited media item comprises a first portion associated with the first bitstream, and a second portion associated with the second bitstream, and wherein the second portion has at least one of a lower resolution than the first portion, or a lower frame rate than the first portion.

* * * * *